United States Patent
Pickett

(10) Patent No.: US 10,228,727 B1
(45) Date of Patent: Mar. 12, 2019

(54) ADJUSTABLE FRONT ASSEMBLY IN HEAD-MOUNTED DISPLAY

(71) Applicant: Facebook Technologies, LLC, Menlo Park, CA (US)

(72) Inventor: David Michael Pickett, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/683,676

(22) Filed: Aug. 22, 2017

(51) Int. Cl.
*G06F 1/16* (2006.01)
*A45F 5/00* (2006.01)

(52) U.S. Cl.
CPC .............. *G06F 1/163* (2013.01); *A45F 5/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,211,903 B1* | 4/2001 | Bullister | ............... | H04N 7/142 348/14.01 |
| 6,369,952 B1* | 4/2002 | Rallison | ............... | G02B 27/017 359/630 |
| 6,515,853 B2* | 2/2003 | Saito | ............... | G06F 1/163 349/58 |
| 7,753,520 B2* | 7/2010 | Fuziak, Jr. | ......... | G02B 27/0172 345/7 |
| 9,417,660 B2* | 8/2016 | Pombo | ............... | G02B 27/0149 |
| 9,690,326 B2* | 6/2017 | Ryu | ............... | G06F 1/1656 |
| 9,733,482 B2* | 8/2017 | West | ............... | G02B 27/0176 |
| 9,897,812 B2* | 2/2018 | Miller | ............... | G02B 27/0176 |
| 9,989,998 B1* | 6/2018 | Yee | ............... | G06F 1/163 |
| 2002/0190923 A1* | 12/2002 | Ronzani | ............... | G02B 27/017 345/50 |
| 2008/0122736 A1* | 5/2008 | Ronzani | ............... | G02B 27/017 345/8 |
| 2008/0198324 A1* | 8/2008 | Fuziak | ............... | G02B 27/0172 351/158 |
| 2013/0285886 A1* | 10/2013 | Pombo | ............... | G02B 27/0149 345/8 |
| 2014/0153173 A1* | 6/2014 | Pombo | ............... | G02B 27/0149 361/679.03 |
| 2014/0347798 A1* | 11/2014 | Mullen | ............... | G06F 1/1624 361/679.03 |
| 2016/0062454 A1* | 3/2016 | Wang | ............... | G09G 5/003 345/633 |
| 2016/0224070 A1* | 8/2016 | Ryu | ............... | G06F 1/1656 |
| 2016/0309143 A1* | 10/2016 | Fu | ............... | H04N 5/2256 |
| 2016/0334628 A1* | 11/2016 | Lyons | ............... | G02B 27/0172 |
| 2017/0094816 A1* | 3/2017 | Yun | ............... | G02B 27/022 |
| 2017/0131555 A1* | 5/2017 | Drinkwater | ......... | G02B 27/0176 |
| 2017/0185109 A1* | 6/2017 | Tatsuta | ............... | G06F 1/163 |

(Continued)

*Primary Examiner* — Lisa Lea Edmonds
(74) *Attorney, Agent, or Firm* — Fenwick & West LLP

(57) ABSTRACT

Embodiments relate to adjustable arms in a head-mounted display. Each adjustable arm includes three separate links that are configured to allow a user to move a front end assembly in numerous ways in order to promote eye relief. Each adjustable arm is composed of a front end assembly link, an interlink, and a back end assembly link. These three links connect to each other in a rotatable manner, allowing a user to adjust the front end assembly into a position that provides the greatest degree of eye relief.

11 Claims, 5 Drawing Sheets

(56) References Cited

U.S. PATENT DOCUMENTS

2017/0216099 A1* 8/2017 Saladino ................ A61F 9/029
2017/0337737 A1* 11/2017 Edwards ............... G06T 19/006
2018/0095498 A1* 4/2018 Raffle ................... G02B 7/026

* cited by examiner

ADJUSTABLE FRONT ASSEMBLY IN HEAD-MOUNTED DISPLAY

BACKGROUND

The present disclosure relates to a head-mounted display (HMD), and specifically, to an adjustable front end assembly in a HMD.

Head-mounted displays may be used to present augmented and/or virtual information to a user. For example, a virtual reality (VR) headset can be used to simulate virtual environments. HMDs are used in a variety of fields, some of these include gaming, engineering, medicine, and aviation.

Because a HMD is designed to present information to a user aligned with the user's field of vision, it typically includes display panels situated closely to the user's face. The display panels are commonly housed in a front end assembly that connects to a back end assembly via connecting arms on both sides of the HMD. However, this is usually a fixed distance, which can introduce a strain on a user's eyes after viewing the display panels over a given period of time.

SUMMARY

Embodiments relate to arms in a HMD that connect a front end assembly and a back end assembly in an adjustable manner. Each adjustable arm includes links that enable movement of the front end assembly relative to the back end assembly. Each adjustable arm is composed of a front end assembly link, an interlink, and a back end assembly link.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit of each reference number corresponds to the figure in which the reference number is first used.

Embodiments relate to an adjustable arm for connecting a front end assembly and a back end assembly of a head mount display. The adjustable arm includes a front end assembly link, an interlink, and a back end assembly link. The front end assembly link connects the front end assembly of the HMD to the interlink in a rotatable manner. The interlink connects the front end assembly link to the back end assembly link in a rotatable manner as well. The back end assembly link connects the interlink to the back end assembly. The adjustable arm enables the height, distance and/or angle of the front end assembly to be adjusted relative to the back end assembly.

Adjustable Arm Structure

Figure 1:
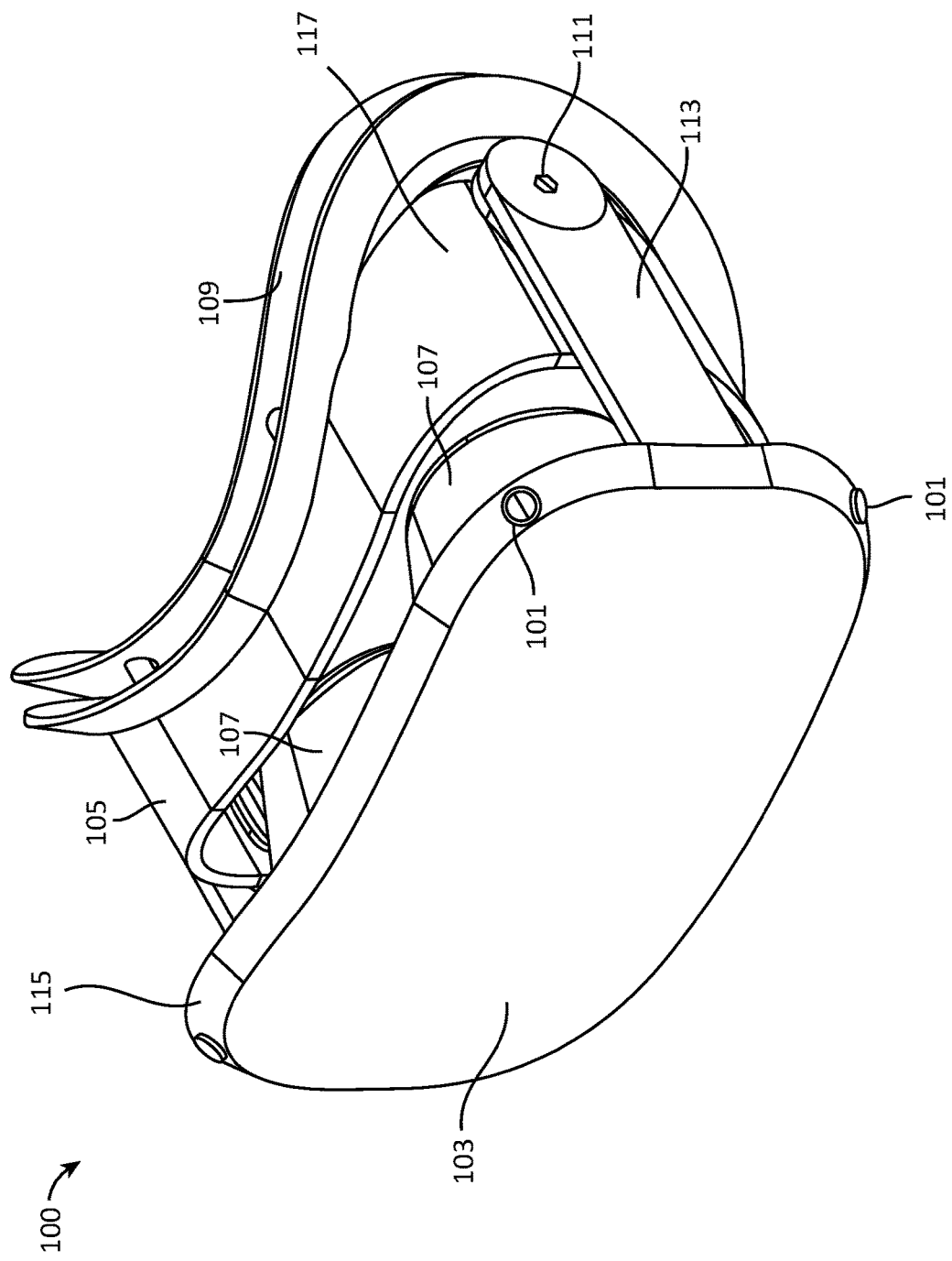
FIG. 1 is a perspective view of a head-mounted display (HMD) according to one embodiment.

FIG. 1 is a perspective view of a HMD 100 according to one embodiment. The HMD 100 may include, among other components, a front end assembly 115 and a back end assembly 117. The front end assembly 115 may include cameras 101, a front visor 103, and eye cones 107. The back end assembly 117 may include a cage 105, a facial interface assembly 109, and guiding tracks. The front end assembly 115 is connected to the back end assembly 117 via two adjustable arms. Each adjustable arm may include a front end assembly link 113, an interlink 201, and a back end assembly link 203. The front end assembly link 113 extends behind the front visor 103 and connects the front end assembly link 113 to the remainder of the adjustable arm via a rotatable bolt 111. The components and the structure of HMD 100 as illustrated in FIG. 1 are merely illustrative.

The front end assembly 115 comprises the front portion of the HMD 100 and includes cameras 101, a front visor 103, and two eye cones 107. The front visor 103 is located at the front of the HMD 100 and is used to protect components inside the front end assembly 115. In one embodiment, the front visor 103 is secured to the eye cones 107 via screws or other fastening mechanisms that enable the front visor 103 to be removed from the front end assembly 115 for maintenance purposes. The front visor 103 has two cameras 101 at the upper two corners of the front visor 103, and two cameras at the lower two corners of the front visor 103. These cameras 101 can be used to capture views outside of the HMD 100 and display them to the user. The eye cones 107 are located behind the front visor 103. The eye cones 107 are configured with two lenses positioned in front of the viewing user's eyes allowing the user to view through the eye cones 107 at two display panels located on the back of the front visor 103.

The back end assembly 117 comprises the back portion of the HMD 100 and makes contact with the user's face when the user wears the HMD 100. The back end assembly 117 is composed of a facial interface assembly 109 and a cage 105. The facial interface assembly 109 is attached to the rear portion of the back end assembly 117. The facial interface assembly 109 is positioned such that its front surface makes contact with the back of the cage 105. The cage 105 is located in front of the facial interface assembly 109, and is constructed in a manner that encloses a user's eyes when the HMD 100 is worn by the user. Two guiding tracks are formed on the inside of both sides the cage 105, and provide paths along which the back end assembly links can slide in order to adjust the position of the front end assembly 115.

Figure 2:
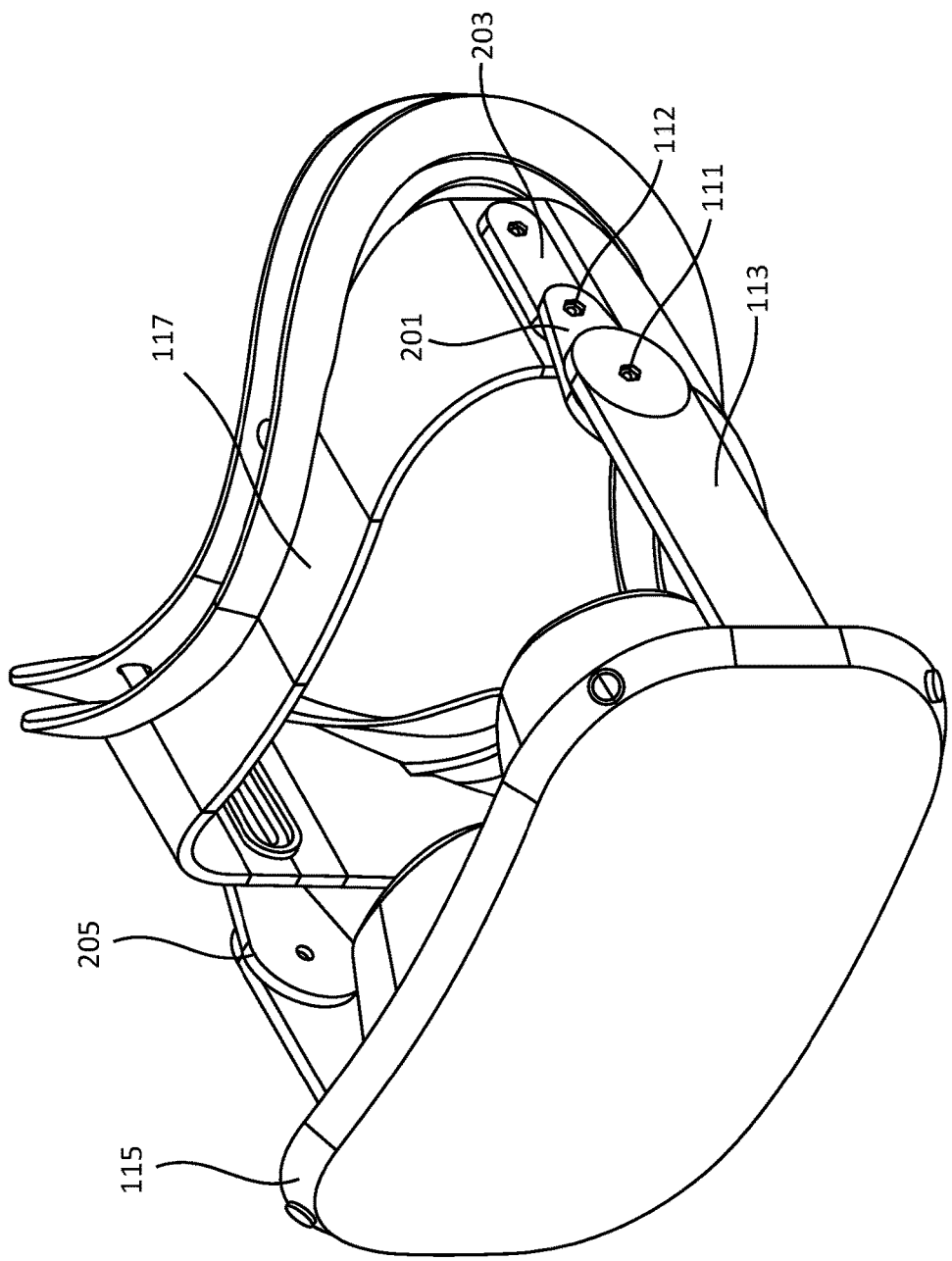
FIG. 2 is a perspective view of the HMD with both adjustable arms extended, according to one embodiment.

FIG. 2 is a perspective view of a HMD 100 with extended adjustable arms according to one embodiment. In the embodiment illustrated in FIG. 2, the adjustable arms 205 connect the front end assembly 115 to the back end assembly 117. Each adjustable arm 205 is comprised of a front end assembly link 113, an interlink 201, and a back end assembly link 203. The front end assembly link 113 and the interlink 201 are connected via a bolt 111. In addition, the interlink 201 and the back end assembly link 203 are connected via a second bolt 112.

Figure 3:
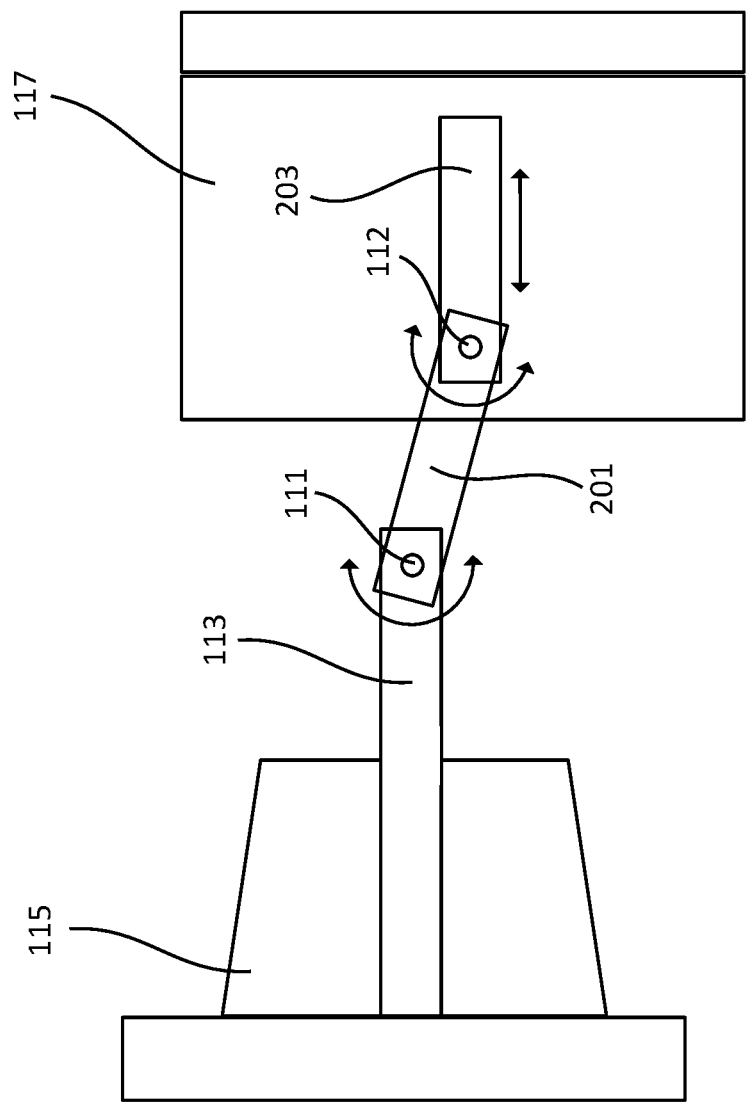
FIG. 3 is a conceptual diagram illustrating the HMD with adjustable arms, according to one embodiment.

FIG. 3 is a conceptual diagram illustrating the HMD with the adjustable arm, according to one embodiment. As illustrated in FIG. 3, the interlink 201 of the adjustable arm 205 is attached at its back end to the front end of the back end assembly link 203 of the adjustable arm 205 in a rotatable manner, allowing the interlink 201 to rotate about a center of the bolt 112 as its fixed axis. The interlink 201 is attached at its front end to the back end of the front end assembly link 113 in a rotatable manner, allowing both links to rotate about the bolt 111. The front end of the front end assembly link 113 is connected to the back end of the front end assembly 115 in a non-rotatable, non-slidable manner, extending behind both sides of the front end assembly 115.

Figure 4A:
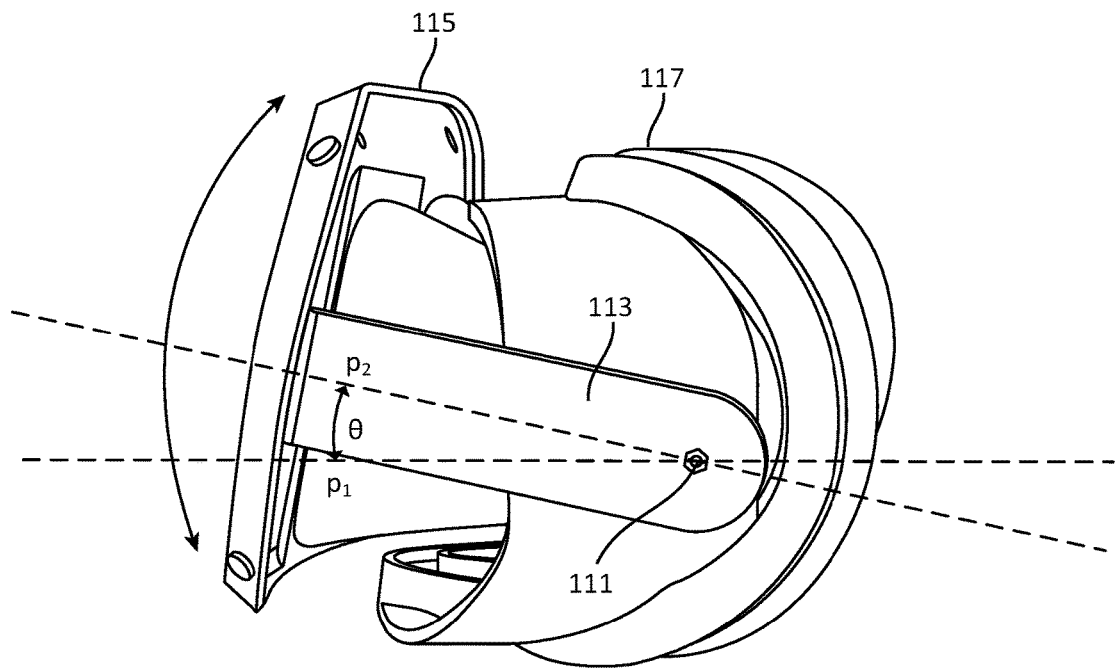
FIG. 4A is a side view of the HMD illustrating a change in tilt of the front end assembly from the back end assembly, according to one embodiment.

FIG. 4A is a side view of the HMD 100 illustrating a change in tilt of the front end assembly 115 in relation to the back end assembly 117, according to one embodiment. As shown in FIG. 4A, the front end assembly 115 can tilt its orientation to a user's face as the front end assembly link 113 rotates about the center of the bolt 111. This tilt movement effectively changes the position of the eye cones 107 in relation to the user's line of sight, allowing the user to change the angle in which the display panels are viewed through the eye cones 107. As illustrated in FIG. 4A, $p_1$ is a line that represents a horizontal line. The front end assembly 115 can be rotated an angle θ relative to the back end assembly 117 to position $p_2$.

Figure 4B:
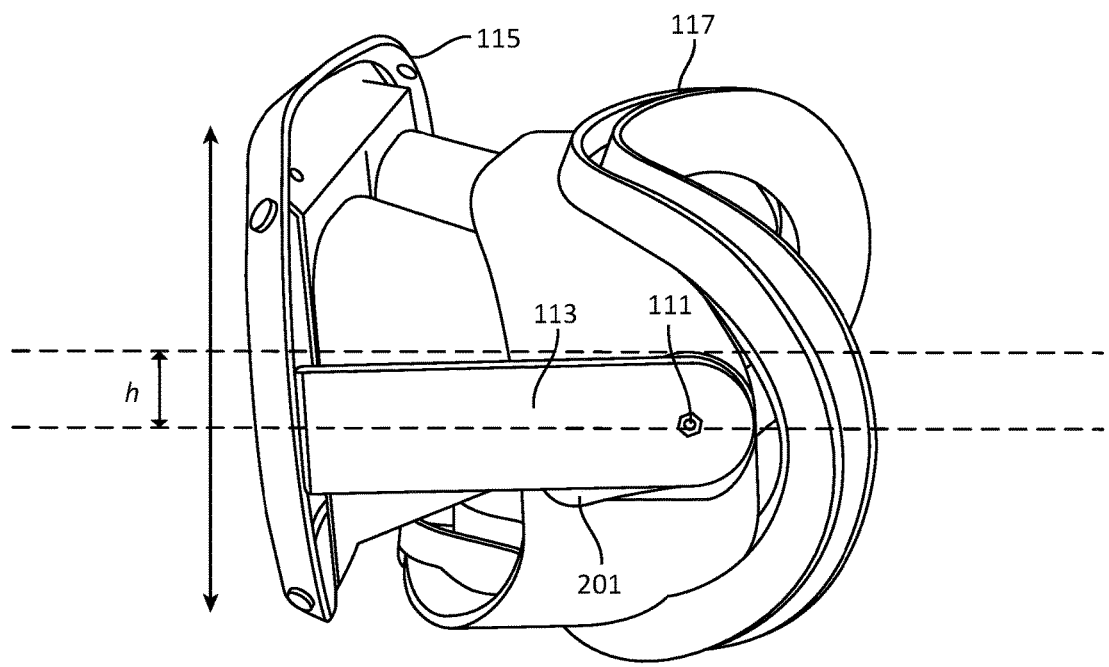
FIG. 4B is a side view of the HMD illustrating a change in the height of the front end assembly from the back end assembly, according to one embodiment.

FIG. 4B is a side view of the HMD 100 illustrating the front end assembly 115 raised by a distance h in relation to the back end assembly 117, according to one embodiment. As illustrated in FIG. 4B, the front end assembly 115 can be raised or lowered by a certain height h as the back end of the interlink 201 rotates about the bolt 112, the front end of the interlink 201 rotates about bolt 111, and the front end assembly link 113 remains fixed. This change in height effectively raises or lowers the eye cones 107 in relation to a user's line of sight, allowing the user to adjust the front end assembly 115 to a position that accommodates the user's preferred viewing height.

Figure 5A:
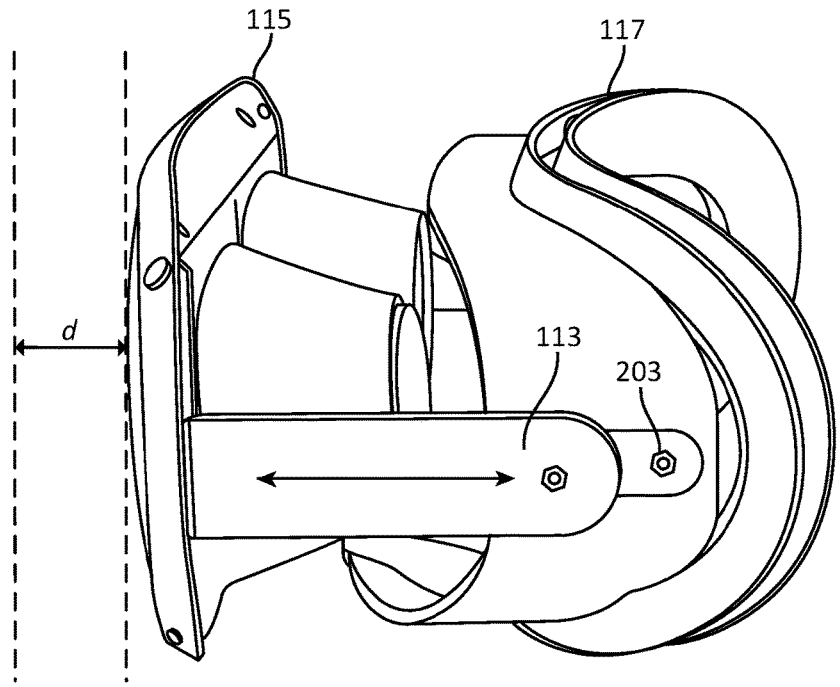
FIG. 5A is a side view of the HMD illustrating a change in distance of the front end assembly from the back end assembly, according to one embodiment.

FIG. 5A is a side view of the HMD 100 illustrating a change in distance of the front end assembly 155 in relation to the back end assembly 117, according to one embodiment. As shown in FIG. 5A, the front end assembly 115 can slide forward and backward to adjust a distance d as the back end assembly link 203 slides horizontally along a guiding track located on the cage 105 of the back end assembly 109 while keeping the interlink 201 and front end assembly link 113 fixed. This movement effectively changes the distance between the eye cones 107 and the user's eyes, allowing a user to adjust the front end assembly 115 to a distance that accommodates the user's eyesight and that promotes the greatest degree of eye relief.

Figure 5B:
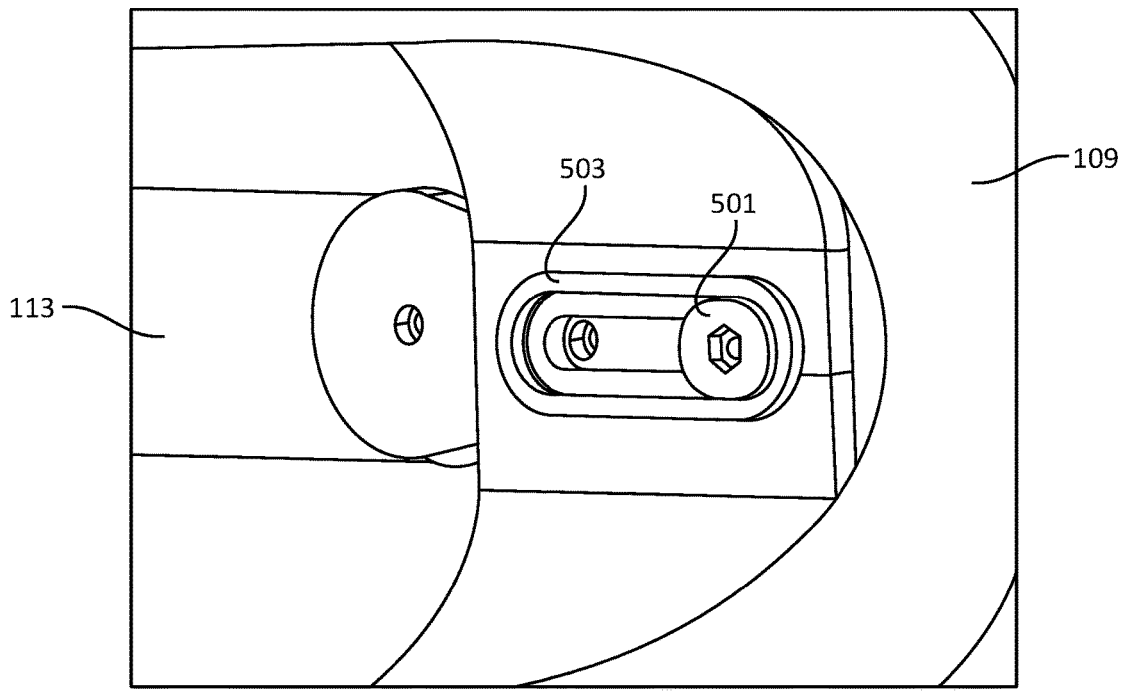
FIG. 5B is a perspective view of a guiding track and inside cage formed inside the back end assembly, according to one embodiment.

FIG. 5B is a perspective view of the guided track 503 through the facial interface assembly 109 located at the back of the HMD 100, according to one embodiment. A bolt 501 extends from the inside surface of the back end assembly link 203 located on the outside of the cage 105, and fits within the inside surface of the guided track 503 as shown in FIG. 5B. The guided track 503 and bolt 501 allow a user to slide the front end assembly 115 a variable distance toward, or away, from the back end assembly 117. The front end assembly link 113 and interlink 201 move in unison as the bolt 501 slide horizontally along the guided track 503 creating this variable distance. If the user experiences eye strain at a given distance, the user may slide the front end assembly 115 into a position that provides the greatest comfort between the users eyes and the eye cones 107.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A head-mounted display, comprising:
 a front end assembly located at a front portion of the head-mounted display;
 a back end assembly located behind the front end assembly, wherein the back end assembly includes a facial interface assembly attached to a rear portion of the back end assembly, the facial interface assembly contoured to contact a user's face; and
 a first adjustable arm between the front end assembly and the back end assembly, the first adjustable arm comprising:
  a front end assembly link attached to the front end assembly to adjust tilting of the front end assembly relative to the back end assembly,
  a back end assembly link rotatably coupled to the back end assembly, and
  an interlink having an end coupled to the front end assembly link and another end rotatably coupled to the back end assembly link, the interlink adjusting a height of the front end assembly relative to the back end assembly.

2. The head-mounted display of claim 1, wherein the front end assembly includes display panels located on an inside of the front end assembly, the display panels aligned with a user's field of vision by adjusting the first adjustable arm.

3. The head-mounted display of claim 1, wherein the front end assembly link is fixed relative to the front end assembly.

4. The head-mounted display of claim 1, wherein the back end assembly further comprises:
 a cage attached to a front of the facial interface assembly, the cage enclosing a user's eyes when the head-mounted display is worn by the user; and
 a first guiding track on which an end of the back end assembly link slides.

5. The head-mounted display of claim 4, wherein the back end assembly link includes a bolt extending from an inside surface of the back end assembly link, the bolt configured to fit within the first guiding track.

6. The head-mounted display of claim 4, further comprising a second guiding track on which an end of a second adjustable arm slides, the second adjustable arm coupled between the front end assembly and the back end assembly at a side of opposite to the first adjustable arm.

7. The head-mounted display of claim 6, wherein the second adjustable arm comprises:
 another front end assembly link attached to the front end assembly to adjust tilting of the front end assembly relative to the back end assembly,
 another back end assembly link attached to the back end assembly, and
 another interlink having an end coupled to the other front end assembly link and another end rotatably coupled to the other back end assembly link.

8. An adjustable arm of a head-mounted display, comprising:
 a front end assembly link attached to a front end assembly at a front portion of the head-mounted display to adjust tilting of the front end assembly relative to a back end assembly, wherein the front end assembly link is fixed relative to the front end assembly;

a back end assembly link rotatably coupled to the back end assembly; and an interlink that rotatably connects the front end assembly link and the back end assembly link, the interlink adjusting a height of the front end assembly relative to the back end assembly.

9. The adjustable arm of claim 8, wherein the front end assembly is located at the front of the head-mounted display and the back end assembly is located behind the front end assembly.

10. The adjustable arm of claim 8, wherein the front end assembly includes display panels located on an inside of the front end assembly, the display panels configured to align with a user's field of vision by adjusting the adjustable arm.

11. The adjustable arm of claim 8, wherein the back end assembly link includes a bolt extending from an inside surface of the back end assembly link, the bolt configured to fit within a first guiding track formed in the back end assembly.

\* \* \* \* \*

UNITED STATES PATENT AND TRADEMARK OFFICE
CERTIFICATE OF CORRECTION

PATENT NO. : 10,228,727 B1
APPLICATION NO. : 15/683676
DATED : March 12, 2019
INVENTOR(S) : David Michael Pickett Page 1 of 1

It is certified that error appears in the above-identified patent and that said Letters Patent is hereby corrected as shown below:

In the Claims

In Claim 6 (Column 4, Line 52), after "at a side," delete "of"

Signed and Sealed this
Tenth Day of September, 2019

Andrei Iancu
*Director of the United States Patent and Trademark Office*